(No Model.)
E. R. STASCH.
BAKING PAN.
No. 424,370. Patented Mar. 25, 1890.
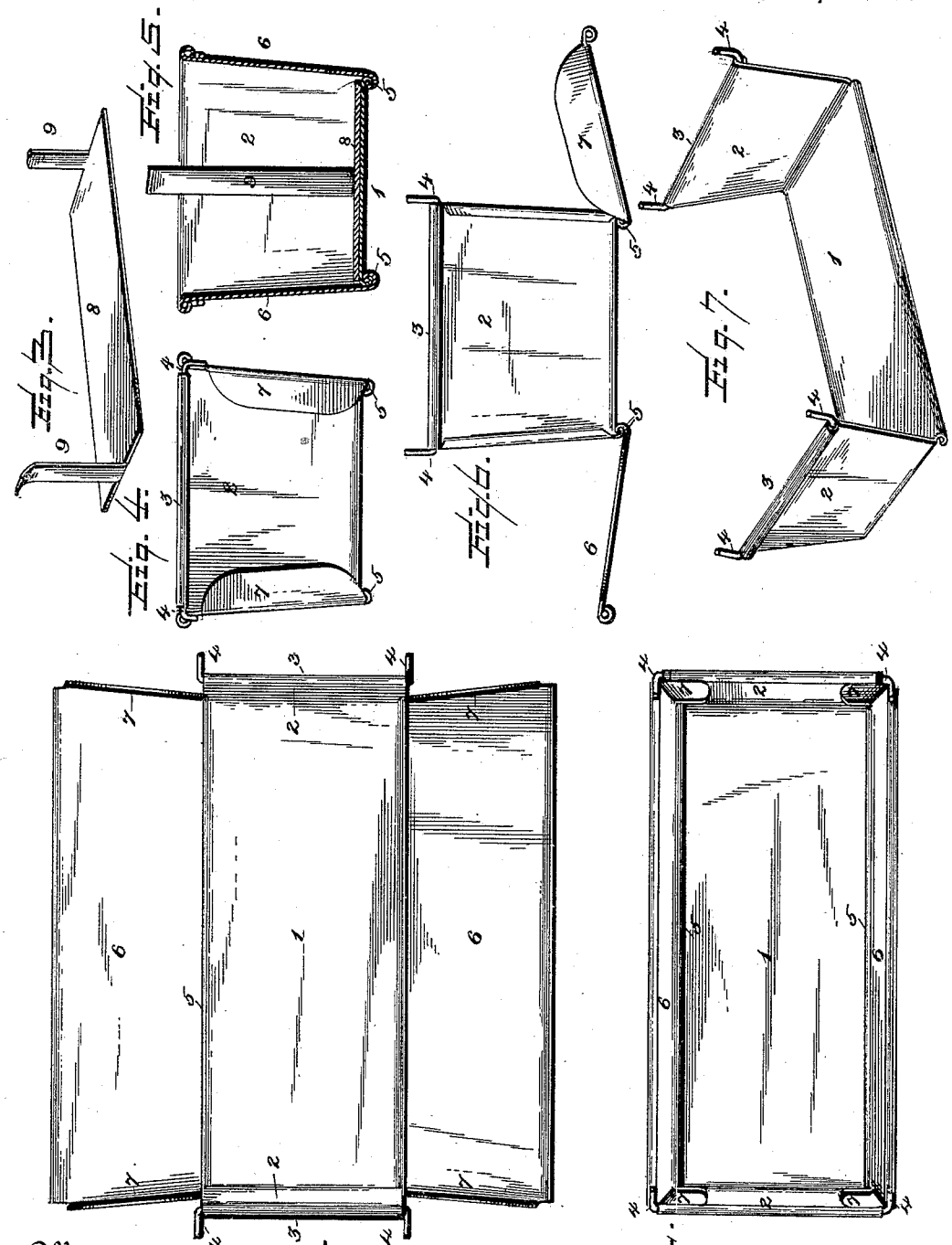
Witnesses:
S. C. Hills,
W. S. Duval
Inventor:
Emil R. Stasch
E. B. Stocking
Attorney

UNITED STATES PATENT OFFICE.

EMIL R. STASCH, OF CORNING, NEW YORK, ASSIGNOR, BY DIRECT AND MESNE ASSIGNMENTS, TO BERTHA STASCH AND VICTOR HAISCHER, BOTH OF SAME PLACE.

BAKING-PAN.

SPECIFICATION forming part of Letters Patent No. 424,370, dated March 25, 1890.

Application filed March 5, 1888. Serial No. 266,187. (No model.)

*To all whom it may concern:*

Be it known that I, EMIL R. STASCH, a citizen of the United States, residing at Corning, in the county of Steuben, State of New York, have invented certain new and useful Improvements in Baking-Pans, of which the following is a specification, reference being had therein to the accompanying drawings.

This invention relates to pans for the baking of bread, cake, puddings, and other articles of cuisine; and the object and advantages of the invention, together with the novel features thereof, will be hereinafter described, and particularly pointed out in the claim.

Referring to the drawings, Figure 1 is a plan of a baking-pan constructed in accordance with my invention, the same being shown in an open position. Fig. 2 is a bottom plan of the pan, the same being closed. Fig. 3 is a perspective of an attachment or cake-lifting plate adapted to rest in the pan. Fig. 4 is an end elevation of the pan. Fig. 5 is a cross-section of the same, the cake-lifter being in position therein. Fig. 6 is an end elevation, the pan being open; and Fig. 7 is a perspective of the pans, the foldable sides being removed.

Similar numerals indicate similar parts in all the figures of the drawings.

Heretofore pans for this purpose have been constructed with the four walls hinged to the bottom, so that the former may be laid flat or in a plane with the bottom, and thus the contents of the pan readily removed without sticking to the sides thereof. Numerous objections to this form of pan have been raised, principal among which is, that the contents, when placed in the pan preparatory to baking in an almost liquid state, run out of the same through the crevices, causing a leakage and waste. The pasty substance also passes between the joints of the pan, which gums the same and prevents their free working, as such substance becomes baked and burned, and its removal is almost impossible.

In practicing my invention I form the bottom 1 and end walls 2 of a single piece of sheet metal, the latter being bent at a right angle to the former, and having their edges turned, as at 3, through which are passed locking-wires 4, the ends of which are bent at a right angle to the body of the wire. The two opposite longitudinal sides of the bottom portion 1 of the pan are bent to form a curved edge 5 continuously and throughout their length, so that they form one member of a hinge-joint.

6 represents the side walls of the pan, the lower edges of which are also bent, as at 5, to form the other member of a hinged joint, which two curved edges are interlocked, the sides to the bottom thus forming the completed unbroken hinge from end to end of the pan. The ends of the side walls 6 are formed with ears or wings 7, which are bent at a right angle to the remainder of the side walls and are adapted to embrace the two end walls of the pan. When in this closed position, the wire locking devices 4 are turned in their bearings so that their bent extremities embrace the side walls. (See Fig. 2.) By forming the members of the hinge as shown—that is, upon the under side of the bottom portion 1 of the pan—said bottom is provided with two opposite longitudinal downwardly-disposed flanges, which protect the same from excessive heat—undesirable in baking—and prevent burning of the pan-bottom and contents.

After the article is baked the wire locking devices 4 are turned so that their bent extremities no longer embrace the sides of the pan, and the sides of said pan may be readily swung down and the cake or other article baked removed.

In Fig. 3 I have shown what may be termed a "cake or bread lifter," and, although herein shown and described in connection with a pan of this class, still may be used with other forms of pans with equal if not further advantage. This lifter consists of a plate portion 8, adapted to rest in the bottom of the pan, and is provided with oppositely-arranged end handles 9, which project above the edge of the pan, and are preferably turned at their tops to afford easy grasping thereof. By this device the cake, bread, or other article, after having been baked, may be gently raised from out the pan, thus avoiding the necessity of reversing the pan and knocking upon its bottom to loosen the article.

I claim—

The combination of the integral bottom and end walls, the former provided at its side edges with underturned flanges to form one side of a continuous hinge and the top edges of the end walls turned over in loops, the wires run through said loops and the sides having their bottom edges turned under to form interlocking flanges, forming with the turned-under flanges of the bottom a hinge, and provided with wings at right angles to the sides and embracing the ends of the pan, substantially as described.

In testimony whereof I affix my signature in presence of two witnesses

EMIL R. STASCH.

Witnesses:
    E. B. STOCKING,
    H. SUTHERLAND.